United States Patent [19]
Lewis

[11] 3,966,235
[45] June 29, 1976

[54] UNDERWATER SEALING OF EXPOSED PORTS IN RELATIVELY CLOSABLE MEMBERS

[75] Inventor: George E. Lewis, Arcadia, Calif.
[73] Assignee: Hydril Company, Los Angeles, Calif.
[22] Filed: Feb. 10, 1975
[21] Appl. No.: 548,513

Related U.S. Application Data
[63] Continuation of Ser. No. 355,484, April 30, 1973.

[52] U.S. Cl.................................. 285/25; 166/.6; 251/176; 277/102; 277/187; 285/28; 285/325
[51] Int. Cl.²................... F16L 35/00; E21B 43/01
[58] Field of Search.................. 285/24, 25, 27, 28, 285/131, 325, 332, 348, 9 R; 277/102, 110, 112, 124, 187; 251/174, 176; 141/353, 354; 166/.5, .6, 85, 75

[56] References Cited
UNITED STATES PATENTS

| | | | |
|---|---|---|---|
| 1,660,766 | 2/1928 | Robinson | 285/131 X |
| 2,080,271 | 5/1937 | Hirst | 277/110 |
| 2,533,059 | 12/1950 | Shaffer | 285/375 X |
| 3,130,952 | 4/1964 | Meyer | 251/176 X |
| 3,227,475 | 1/1966 | Sinkinson | 285/325 X |
| 3,326,579 | 6/1967 | Fowler | 285/9 R X |
| 3,701,549 | 10/1972 | Koomey et al | 285/24 |

*Primary Examiner*—Ernest R. Purser
*Attorney, Agent, or Firm*—William W. Haefliger

[57] ABSTRACT

Sealing apparatus seals off between first and second member faces and about registered ports opening at the faces, the members being relatively movable. The apparatus comprises:

a. first and second concentric tubular inserts carried by one of the members for relative telescopic movement, the inserts extending about the port in said one member, at least one of the inserts having an end portion projecting endwise outwardly relative to said one member to be forcibly engaged by the other member for inwardly displacing said one insert in response to said member relative movement toward one another, and b. elastomeric means located between said inserts to transfer compressive force from said one insert to the other insert in response to said inward displacement of the one insert, and to be compressively urged in an outward direction into annular sealing engagement with the face of said other member about the port mouth therein.

11 Claims, 3 Drawing Figures

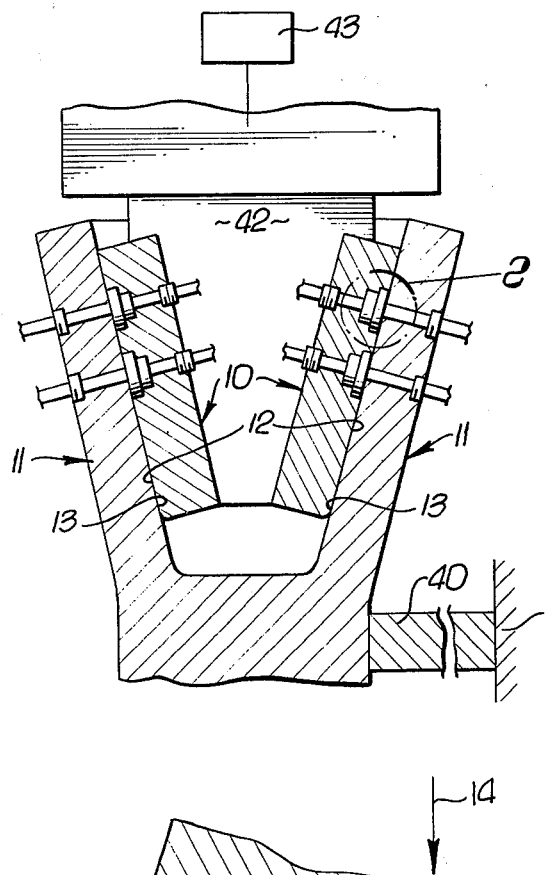
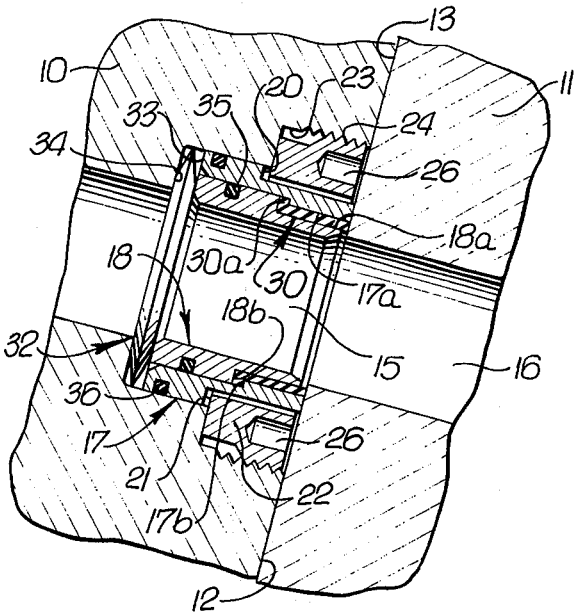
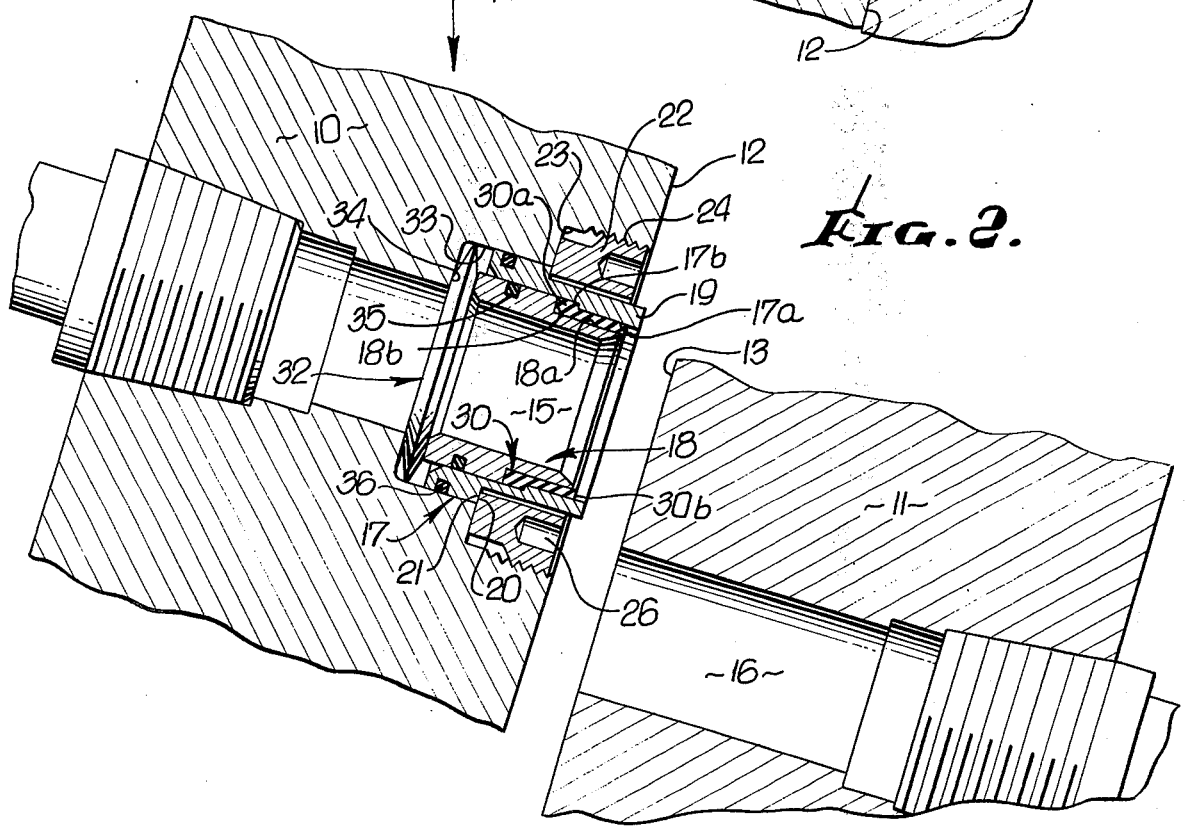

UNDERWATER SEALING OF EXPOSED PORTS IN RELATIVELY CLOSABLE MEMBERS

This is a continuation, of application Ser. No. 355,484, filed Apr. 30, 1973.

BACKGROUND OF THE INVENTION

This invention relates generally to sealing apparatus, and more particularly concerns sealing off the interface between members brought together underwater and about fluid passing ports formed in such members.

Conventional sub-sea well drilling and production involves the use and operation of a large number of fluid pressure responsive actuators. The latter operate sub-sea equipment such as valves, blow-out preventers, hydraulic rams, etc. Typically, the actuators are located on a stack of well head equipment on the ocean floor, and it becomes necessary and desirable to establish fluid pressure communication with the actuator via an underwater connector part of which may be lowered to the stack from the surface. The connector includes members one of which is lowered into face to face relation with the other to bring fluid pressure ports in the member into registration. Sealing of the ports then becomes critically necessary. Prior seals for this purpose not only were undesirably large, complex, difficult to align correctly and subject to malfunction, but they lacked the unusually advantageous structure and mode of operation of the sealing apparatus disclosed herein.

SUMMARY OF THE INVENTION

It is a major object of the invention to provide underwater port sealing apparatus characterized as overcoming the problems and difficulties inherent in prior seals.

Basically, the environment of the invention comprises first and second members having mutually opposed flat faces which are relatively movable toward and away from one another, the members defining ports to be brought into open registration in response to such member relative movement toward one another. The sealing apparatus of the invention to seal off between the faces and about the registered ports comprises first and second concentric tubular inserts carried by one of the members for relative telescopic movement, the inserts extending about the port in that member and at least one of the inserts having an end portion projecting endwise outwardly relative to the one member to be forcibly engaged by the face of the other member for inwardly displacing that one insert in response to said member relative closing movement; and, elastomeric means located between the inserts to transfer compressive force from the one insert to the other in response to such inward forcible displacement of the one insert, and to be compressively urged in an outward direction into annular sealing engagement with the metal face of the other member about the port mouth therein.

Additional objects include the provision of an annular bead integral with the elastomeric means and extending in the space formed between axially oppositely facing shoulders on the inserts, so as to develop the compressive urging of the elastomeric means in an outward direction, to establish the seal, as described; the protection of the typically rubber to metal seal by the metallic end portion of the one insert, as referred to; the provision of spring means to resiliently urge the other insert in the outward direction so as to develop sealing pressure transmitted via both the one insert and the elastomer means for application to the face of the other member; the provision of means to limit outward displacement of the one insert, and the provision of a number of such seals on members associated with a stack of underwater well head equipment.

These and other objects and advantages of the invention, as well as the details of an illustrative embodiment, will be more fully understood from the following description and drawings, in which:

DRAWING DESCRIPTION

FIG. 1 is an elevation showing an undersea wedge type connector containing ports to be sealed;

FIG. 2 is an elevation showing portions of the connector members, with a typical porting seal, prior to member closure; and FIG. 3 is a view like FIG. 3 after member closure.

DETAILED DESCRIPTION

Referring first to FIGS. 2 and 3, first and second members 10 and 11 have mutually opposed flat faces 12 and 13 which are relatively movable toward and away from one another; for example, member 10 is typically movable in the direction indicated by arrow 14 toward member 11 in order to close face 12 toward parallel face 13 for bringing port 15 in member 10 into overlapping (and preferably coaxial) registration with port 16 in member 11. The latter condition is shown in FIG. 2.

In accordance with the invention, improved sealing apparatus is provided to seal off between the faces 12 and 13 and about the ports brought into registration. Such apparatus comprises first and second tubular inserts carried by one of the members 10 and 11 for relative telescopic movement. Typically, the inserts are carried by the member 10 which is normally retrievable at the surface enabling repair and servicing of multiple seals in that member. The inserts, designated at 17 and 18, extend coaxially and concentrically about the port 15, and at least one insert (as for example 17) has an annular end portion 19 which projects endwise outwardly relative to the plane of face 12 of member 10, as seen in FIG. 3, in order to be forcibly engaged by the other member 11 for inwardly displacing insert 17 in response to closing relative movement of the members 10 and 11 toward one another. The extent of such outward projection of end portion 19 is limited by engagement of a stop shoulder 20 on insert 17 with end face 21 of an annular retainer 22. The latter is received in a counter bore 23 formed in member 10 and is removably attached to that member via thread connection 24. A removal tool may be inserted into drilled openings 26 formed in the retainer 22 for forcibly rotating and withdrawing the retainer in order to repair or replace the inserts.

Elastomeric means is located between the inserts, and preferably bonded to insert 18, to transfer compressive force from the one insert 17 to the other insert 18 in response to inward displacement of the former, and to be compressively urged in an outward direction into annular sealing engagement with face 13 of member 11 about port 16 therein. In the example, rubber ring 30 radially fills space between the bore 17a of insert 17 and the outer cylindrical surface 18a of insert 18, the rubber ring including an annular bead 30a extending in the space formed between axially oppositely facing shoulders 17b and 18b on the inserts. Also, the rubber ring 30 extends axially from the bead to an outwardly exposed locus 30b proximate end portion 19 of insert 17. As the insert 17 is forcibly moved inwardly by face 13 of member 11, the bead 30a is axially compressed between shoulders 17b and 18b, which squeezes the rubber axially toward face 13 of member 11, effecting the seal. Note that the metallic annular end portion 19 of the insert 17 extends protectively about the rubber to metal seal, as described.

Also provided is what may be referred to as spring means for resiliently urging the insert 18 in an outward direction. In the example, an annular Belleville spring 32 fits in bore 33 between bore shoulder 34 and the inner end of insert 18 to resist inward displacement of the latter, adding to the resiliency of the seal package. As the faces 12 and 13 move together the final increment, both inserts are pushed toward the Belleville spring to tension same and develop sealing pressure of both the insert end 19 and the rubber at 30b against the face 13. O-rings 35 and 36 respectively seal off between the inserts, and between the insert 17 and bore 33. The apparatus has unusual utility when used for sealing off about registered ports in members 10 and 11 which are relatively movable underwater. Referring to FIG. 1, receptacle shaped member 11 is supported at 40 by an underwater stack of well head equipment, represented at 41; and wedge-shaped member 10, is shown as schematically supported at 42 to be lowered in the ocean into closing engagement with receptacle member 11. Surface means to effect such lowering, and elevation of member 10, is indicated at 43. Faces 12 and 13 extend in parallel relation and at angle from vertical less than 90°. In this regard, reference is made to co-pending application of George E. Lewis and Fernando Murman entitled "Underwater Multiple Fluid Line Connector".

I claim:
1. For combination with first and second members having mutually opposed faces which are relatively movable toward and away from one another, the members defining ports to be brought into open registration in response to said member relative movement toward one another, improved sealing apparatus to seal off between said faces and about said registered ports, comprising
   a. first and second concentric tubular inserts carried by one of the members for relative telescopic movement, the inserts extending about the port in said one member, at least one of the inserts having an end portion projecting endwise outwardly relative to said one member to be forcibly engaged by the other member for inwardly displacing said one insert in response to said member relative movement toward one another, and
   b. elastomeric means located in a space defined by and between said inserts to transfer compressive force from said one insert to the other insert in response to said inward displacement of the one insert, and to be compressively urged in an outward direction into annular sealing engagement with the face of said other member about the port mouth therein,
   c. said inserts having shoulders facing said space so as to have relative movement toward one another in response to said inward displacement of the one insert, both said inserts extending endwise inwardly beyond the innermost extent of said elastomeric means.

2. The sealing apparatus of claim 1 wherein said one insert extends concentrically about the other insert and other means sealing off between said inserts inwardly of said elastomeric means.

3. The sealing apparatus of claim 2 wherein the elastomeric means is bonded to said other insert.

4. The sealing apparatus of claim 1 including an underwater stack of well head equipment supporting said other member, and means supporting said one member for vertical relative movement toward said other member to move said port in the other member from out of registration with the port in said one member into registration therewith.

5. The sealing apparatus of claim 4 wherein said faces extend in parallel relation and at an angle from vertical less than 90°.

6. The sealing apparatus of claim 1 including retainer structure on said one member for limiting said outward movement of said one insert.

7. The sealing apparatus of claim 1 including spring means for resiliently urging said other insert in said outward direction, thereby to develop sealing pressure transmitted via both said one insert and said elastomer means for application to said other member.

8. For combination with first and second members having mutually opposed faces which are relatively movable toward and away from one another, the members defining ports to be brought into open registration in response to said member relative movement toward one another, improved sealing apparatus to seal off between said faces and about said registered ports, comprising
   a. first and second concentric tubular inserts carried by one of the members for relative telescopic movement, the inserts extending about the port in said one member, at least one of the inserts having an end portion projecting endwise outwardly relative to said one member to be forcibly engaged by the other member for inwardly displacing said one insert in response to said member relative movement toward one another, and
   b. elastomeric means located between said inserts to transfer compressive force from said one inserts to the other insert in response to said inward displacement of the one insert, and to be compressively urged in an outward direction into annular sealing engagement with the face of said other member about the port mouth therein,
   c. said inserts extending coaxially and having axially oppositely facing shoulders which are axially spaced apart, said elastomeric means extending in the space between said shoulders, both said inserts extending endwise inwardly beyond the innermost extent of the elastomeric means.

9. The sealing apparatus of claim 8 wherein the elastomeric means defines an annular bead in said space, and the elastomeric means extends axially between the inserts from said bead to an outwardly exposed locus proximate said end portion of the one insert.

10. For combination with first and second members having mutually opposed faces which are relatively movable toward and away from one another, the members defining ports to be brought into open registration in response to said member relative movement toward one another, improved sealing apparatus to seal off between said faces and about said registered ports, comprising a. first and second concentric, coaxial, metallic, tubular inserts carried by one of the members for relative telescopic movement, the inserts extending about the port in said one member, the inserts having end portions projecting endwise forwardly toward the other member so that at least one of said end portions on one insert is forcibly engaged by said other member for inwardly displacing said one insert in response to said relative movement of the members toward one another, and
b. means located to yieldably resist inward displacement of both of the inserts, said means comprising first yieldable structure interposed in endwise force transmitting relation between said inserts, and second yieldable structure located rearwardly of said members to receive force transmitted endwise rearwardly thereby, both said inserts extending endwise rearwardly beyond the rearwardmost extent of said first yieldable structure.

11. The sealing apparatus of claim 10 wherein said one member contains a cylindrical recess receiving said members, there being an annular retainer carried by said one member retaining a first of the inserts against removal from said recess.

* * * * *